United States Patent
Kerstan et al.

(10) Patent No.: US 7,369,228 B2
(45) Date of Patent: May 6, 2008

(54) COMPACT SPECTROMETER

(75) Inventors: Felix Kerstan, Jena (DE); Ullrich Klarner, Jena (DE); Nico Correns, Weimar (DE); Gregor Tumpach, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 182 days.

(21) Appl. No.: 10/544,555

(22) PCT Filed: Dec. 19, 2003

(86) PCT No.: PCT/EP03/14588

§ 371 (c)(1),
(2), (4) Date: Jan. 20, 2006

(87) PCT Pub. No.: WO2004/070329

PCT Pub. Date: Aug. 19, 2004

(65) Prior Publication Data

US 2006/0139636 A1 Jun. 29, 2006

(30) Foreign Application Priority Data

Feb. 4, 2003 (DE) ............................. 103 04 312

(51) Int. Cl.
*G01J 3/36* (2006.01)
(52) U.S. Cl. ..................... 356/328; 250/239
(58) Field of Classification Search ............... 356/328, 356/326; 250/239; 359/570, 572
See application file for complete search history.

(56) References Cited

U.S. PATENT DOCUMENTS 4,644,632 A * 2/1987 Machler et al. ............... 29/469
4,709,989 A * 12/1987 Machler ..................... 359/896
5,026,160 A * 6/1991 Dorain et al. ............... 356/328
5,159,404 A * 10/1992 Bittner ....................... 356/328
5,604,589 A * 2/1997 Kraiczek .................... 356/328

(Continued)

FOREIGN PATENT DOCUMENTS

DE 196 09 916 9/1987

(Continued)

OTHER PUBLICATIONS

Machine translation of EP 1041372 A1 from European Patent Office.*

*Primary Examiner*—Samuel A. Turner
*Assistant Examiner*—Bryan J Giglio
(74) *Attorney, Agent, or Firm*—Reed Smith LLP

(57) ABSTRACT

The present invention is directed to a spectrometer in which the electrical and optical components are connected to one another in a compact construction. A minimal expenditure on assembly and adjustment is achieved through a small quantity of individual parts. The compact spectrometer comprises an entrance slit, an imaging grating, one or more detector elements in rows or matrices, and elements of a controlling and evaluating unit. The detector elements and the entrance slit are arranged on a shared support, the elements of the controlling and evaluating unit being arranged on the free surfaces of the support. The entrance slit and the detector elements and the imaging spherical grating recessed into the spectrometer housing are arranged symmetric to an imaginary center axis of the support. Due to its compact size and the minimized expenditure on adjustment and assembly for its manufacture, the inventive spectrometer has numerous applications.

10 Claims, 2 Drawing Sheets

U.S. PATENT DOCUMENTS

| | | | |
|---|---|---|---|
| 5,615,010 A * | 3/1997 | Kraiczek et al. | 356/328 |
| 5,812,262 A * | 9/1998 | Ridyard et al. | 356/328 |
| 5,953,118 A | 9/1999 | O'Rourke et al. | |
| 5,995,221 A | 11/1999 | Slutter et al. | |
| 6,081,331 A * | 6/2000 | Teichmann | 356/328 |
| 6,181,418 B1 * | 1/2001 | Palumbo et al. | 356/328 |
| 6,606,156 B1 * | 8/2003 | Ehbets et al. | 356/328 |
| 6,879,395 B2 * | 4/2005 | Oka et al. | 356/326 |
| 7,081,955 B2 * | 7/2006 | Teichmann et al. | 356/328 |
| 7,202,949 B2 * | 4/2007 | Weeks et al. | 356/328 |
| 2002/0060792 A1 * | 5/2002 | Ibsen et al. | 356/328 |

FOREIGN PATENT DOCUMENTS

| | | |
|---|---|---|
| DE | 195 04 835 | 3/1996 |
| DE | 299 06 678 | 9/1999 |
| DE | 198 35 595 | 2/2000 |
| EP | 1 041 372 | 10/2000 |
| EP | 1041372 A1 * | 10/2000 |

* cited by examiner

COMPACT SPECTROMETER

CROSS-REFERENCE TO RELATED APPLICATIONS

This application claims priority of International Application No. PCT/EP2003/014588, filed Dec. 19, 2003, and German Application No. 103 04 312.8, filed Feb. 4, 2003, the complete disclosures of which are hereby incorporated by reference.

BACKGROUND OF THE INVENTION a) Field of the Invention

The present invention is directed to a compact spectrometer in which the electrical and optical components are permanently connected to one another. A minimal expenditure on assembly and adjustment is achieved through a small quantity of individual parts.

b) Description of the Related Art

According to the known prior art, miniaturized spectrometer systems are often needed so as to ensure a broad range of application. The combination of high-performance digital electronics with the optical components and the use of flexible light-conducting fibers results in spectrometers whose areas of application range from routine analysis in the laboratory to special tasks in process measurement technology and quality control in manufacturing processes. Consequently, numerous spectrometric systems for many different applications are known from the art.

An arrangement for measuring optical spectra is described in DE 198 36 595. In these spectrometers, the optical and electronic components are arranged one above the other in a sandwich-type construction and are permanently connected to one another, Owing to this manner of construction, these spectrometers are very compact and robust. However, the expenditure on adjustment of the optical components, particularly reflection gratings and mirrors, appears to be considerable.

The spectrometer described in EP 1 041 372 has means for connecting the individual optical components in a simpler manner in order to reduce expenditure on adjustment of the optical system, which is an important cost factor in the manufacture of spectrometers of this type.

Concentric spectrometers are described in U.S. Pat. No. 6,181,418 and U.S. Pat. No. 5,995,221. Due to the concentric shape of the housing parts and other structural component parts, thermally-dependent expansion and stress can be kept well under control. The proposed solution reduces stray light and reflection spectra which substantially influence the sensitivity and measurement accuracy of the spectrometers. In this solution, expenditure on adjustment is also considerable due to the large number of individual parts.

In the solution described in DE 196 09 916, a miniaturized compact spectrometer is used for the detection and sorting of plastics in the recycling industry. For cost reasons, instead of complete lines of detectors, a small number of irregularly spaced detectors are arranged at the points of the generated spectrum that are sufficient for detecting and distinguishing sorts of materials. While this reduces the readout time and evaluating time, the expenditure on adjustment and assembly is increased due to the individual detectors.

Utility Model Application DE 299 06 678 describes a small spectrometer for determining the condition of surfaces of roadways and/or vehicles. The housing parts are manufactured in such a way that they have cutouts, grooves and pins, so that the other structural components parts can be brought into the pre-defined position in a simple manner. Accordingly, only a slight expenditure is required for fine adjustment.

However, the spectrometer arrangements mentioned above have the disadvantage that, even with optimized manufacture requiring only a fine adjustment of the optical components, the expenditure on assembly and adjustment is too high due to the quantity of elements to be adjusted. Accordingly, economical and effective large-scale production is impossible.

OBJECT AND SUMMARY OF THE INVENTION

It is the primary object of the present invention to develop a spectrometric arrangement which has compact dimensions and in which the expenditure required for adjustment and assembly is minimized.

According to the invention, this object is met by a compact spectrometer comprising an entrance slit, an image grating, one or more detector elements in rows of matrices and elements of a controlling and evaluating unit. The detector elements and the entrance slit are arranged on a shared support. The support is adapted to contain the elements of the controlling and evaluating unit on its free surfaces. The imaging grating is arranged in the spectrometer housing. The spectrometer housing and the support have means required for an exactly fitting and reliable assembly. The means comprise at least a fixed bearing and a movable bearing. The detector elements, the entrance slit and the imaging grating in the spectrometer housing are arranged symmetric to an imaginary center axis of the support.

Due to its compact structural size and the minimized expenditure on adjustment and assembly required for its manufacture, the spectrometer according to the invention has applications ranging from routine laboratory analysis to special tasks in process measurement technology and quality control in manufacturing processes.

The invention will be described in the following with reference to an embodiment example.

DESCRIPTION OF THE PREFERRED EMBODIMENTS

Figure 1:
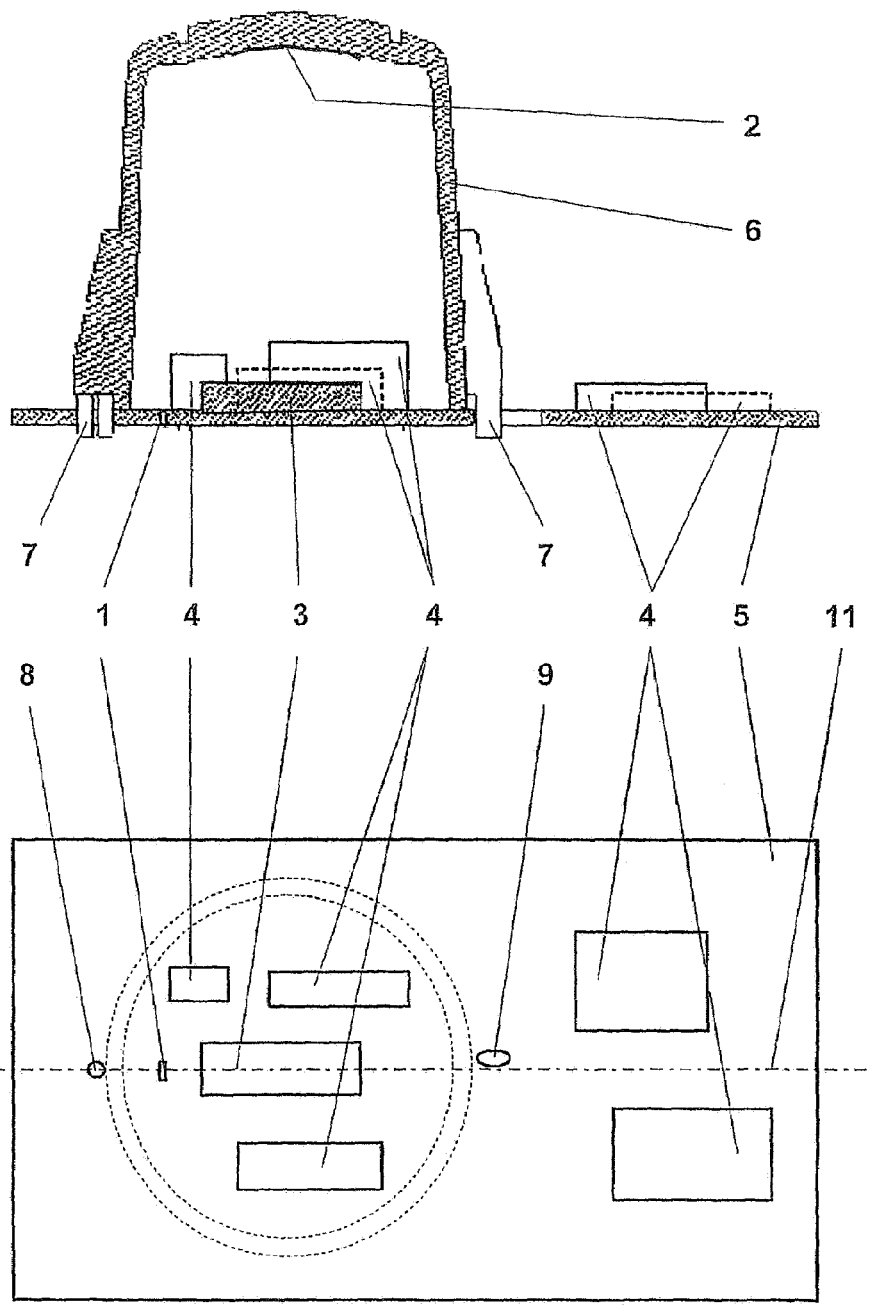
FIG. 1 is a sectional view of the spectrometer.

The compact spectrometer shown in section in FIG. 1 comprises an entrance slit 1, an imaging grating 2, one or more detector elements 3 in rows or matrices, and elements of a controlling and evaluating unit 4. The detector elements 3 and the entrance slit 1 are arranged on a shared support 5, preferably a printed circuit board made of ceramic material, wherein the entrance slit 1 is constructed as a rectangular opening. Additional elements of the controlling and evaluating unit 4 can be arranged on the free surfaces of the support 5 both inside and outside the spectrometer housing 6. The detector elements 3, the entrance slit 1 and the additional elements of the controlling and evaluating unit 4 can be manufactured in the printed circuit board fabricating process with a relatively low expenditure on exact mutual positioning.

The imaging grating 2 having a spherical shape is arranged in the spectrometer housing 6. The two elements comprise materials with identically high expansion coefficients as far as possible. The fastening of the imaging grating 2 to the spectrometer housing 6 is carried out by means of spring elements or by gluing or welding. However, it is also possible that the spectrometer housing 6 and the imaging grating 2 are manufactured as an injection molded part.

The support 5 and the spectrometer housing 6 possess the means required for an exactly fitting and reliable assembly. These means comprise at least a fixed bearing and a movable bearing. For this purpose, the spectrometer housing 6 has corresponding pins 7 and the support 5 has the required bore holes 8 and 9. Bore hole 9, which is the movable bearing, is constructed as an elongated hole. The pins 7 projecting through the support 5 can be widened at their underside so as to ensure a secure fit (FIG. 1).

In another constructional variant, the support 5 and the spectrometer housing 6 can be glued together or welded together after being assembled in an exact fit.

Figure 3:
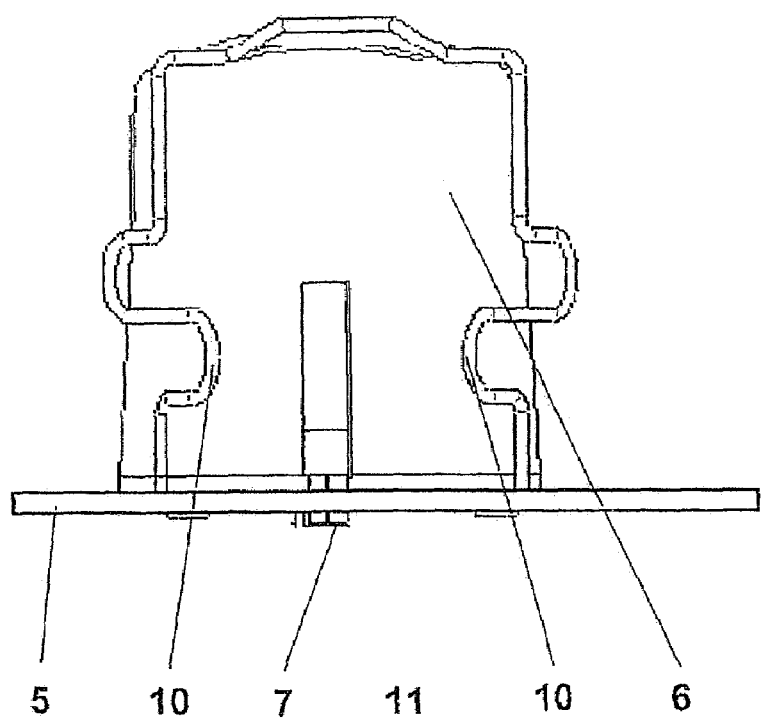
FIG. 3 is a side view of the spectrometer.
Figure 4:
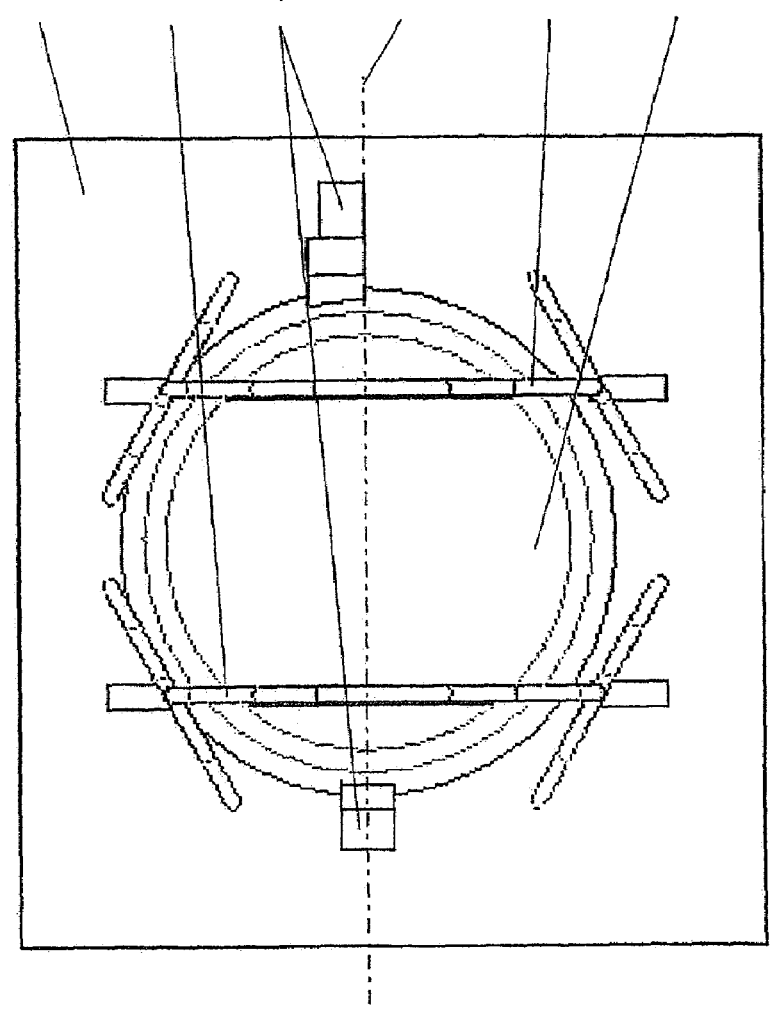
FIG. 4 is a top view of the spectrometer.

FIG. 3 shows a side view of the compact spectrometer in which the spectrometer housing 6 and the support 5 are connected by means of one or more spring elements 10 in order to ensure a frictional engagement. For this purpose, the spectrometer housing 6 has corresponding notches on its upper surface in which the spring elements 10 snap in. FIG. 4 shows a top view of a spectrometer housing 6 which is held in this way.

Figure 2:
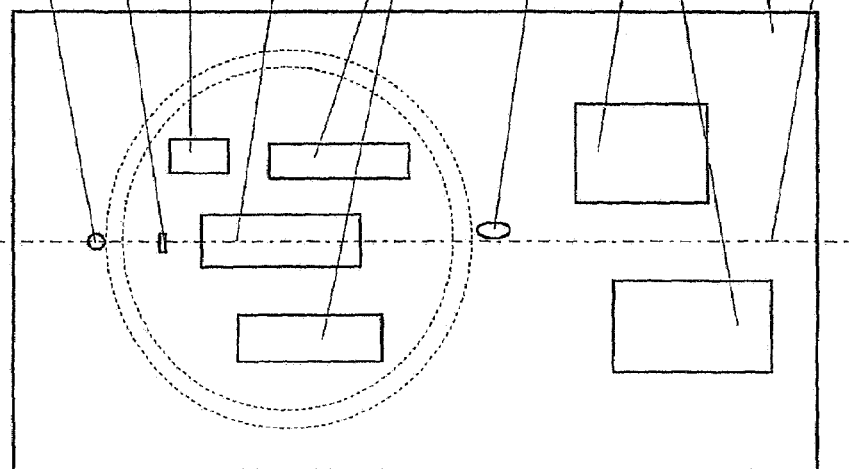
FIG. 2 is a top view of the support.

As is shown in FIG. 2, the detector elements 3 located on the support 5, the entrance slit 1, and the imaging grating 2 in the spectrometer housing 6 are arranged symmetric to an imaginary center axis 11 of the support 5. Accordingly, they remain adjusted relative to one another even when expansion occurs as a result of thermal loading.

In another construction, the arrangement has, at the underside of the support 5, one or more light sources for illuminating the test object. The opening in the support 5 serving as entrance slit 1 can have additional optics for bundling the light coming from the test object and/or a holder for fastening a fiber-optic cable.

The spectrometer housing 6 is preferably produced by injection molding technique. The injection mold comprises an inner part and an outer part. Injection is carried out parallel to the grating rule direction, wherein the sprues are on the non-critical outer side because no special accuracy requirements are set for the outer shape of the spectrometer housing 6.

The spectrometer housing 6 is produced from a light-absorbing (colored) material and can be coated with aluminum or gold in order to prevent absorption of moisture and, therefore, swelling. Depending on the wavelength region, the imaging grating 2 is to be coated with a reflection layer of aluminum or gold and, if necessary, with an additional protective layer.

The arrangement according to the invention provides a spectrometer having a wide range of applications due to its compact size and the minimized expenditure on adjustment and assembly for its manufacture. The compact spectrometer is suitable for tasks ranging from routine laboratory analysis to process measurement technique and quality control in manufacturing processes.

While the foregoing description and drawings represent the present invention, it will be obvious to those skilled in the art that various changes may be made therein without departing from the true spirit and scope of the present invention.

The invention claimed is:

1. A compact spectrometer comprising:

an entrance slit;

an imaging grating;

one or more detector elements in rows or matrices; and elements of a controlling and evaluating unit;

said detector elements and the entrance slit being arranged on a shared support, said support being adapted to contain the elements of the controlling and evaluating unit on its free surfaces;

said entrance slit being constructed as a rectangular opening in said support;

said imaging grating being arranged in a spectrometer housing;

said spectrometer housing and said support having means required for an exactly fitting and reliable assembly, said means comprising at least a fixed bearing and a movable bearing; and said detector elements, said entrance slit, and said imaging grating in the spectrometer housing being arranged symmetric to an imaginary center axis of the support.

2. The compact spectrometer according to claim 1, wherein a printed circuit board, comprising ceramic material, is provided as support.

3. The compact spectrometer according to claim 1, wherein the spectrometer housing and the imaging grating comprise materials having identically high expansion coefficients to the extent possible, the imaging grating having a spherical shape and adapted to being recessed into the spectrometer housing.

4. The compact spectrometer according to claim 1, wherein the spectrometer housing and the imaging grating are connected to one another by means of spring elements, by gluing, or by welding.

5. The compact spectrometer according to claim 1, wherein the spectrometer housing and the imaging grating are an injection molded part.

6. The compact spectrometer according to claim 1, wherein the spectrometer housing has corresponding pins and the support has the required bore holes for an exactly fitting and reliable assembly, one of the bore holes being constructed as an elongated hole and the pins projecting through the support being widened at their underside so as to ensure a secure fit.

7. The compact spectrometer according to claim 1, wherein the spectrometer housing and the support are connected to one another by one or more spring elements so as to ensure a secure fit.

8. The compact spectrometer according to claim 1, wherein the spectrometer housing and the support are glued or welded to one another after being joined together in an exact fit so as to ensure a secure fit.

9. The compact spectrometer according to claim 1, wherein the entrance slit has additional optics for bundling the light coming from a test object and/or a holder for fastening a fiber-optic cable.

10. A compact spectrometer comprising:

an entrance slit;

an imaging grating;

one or more detector elements in rows or matrices; and elements of a controlling and evaluating unit;

said detector elements and the entrance slit being arranged on a shared support, said support being adapted to contain the elements of the controlling and evaluating unit on its free surfaces;

said imaging grating being arranged in a spectrometer housing;

said spectrometer housing and said support having means required for an exactly fitting and reliable assembly, said means comprising at least a fixed bearing and a movable bearing; and said detector elements, said entrance slit, and said imaging grating in the spectrometer housing being arranged symmetric to an imaginary center axis of the support; and wherein one or more light sources are located at the underside of the support for illuminating a test object.

* * * * *